S. McBRIDE.
Animal-Trap.
No. 198,246. Patented Dec. 18, 1877.
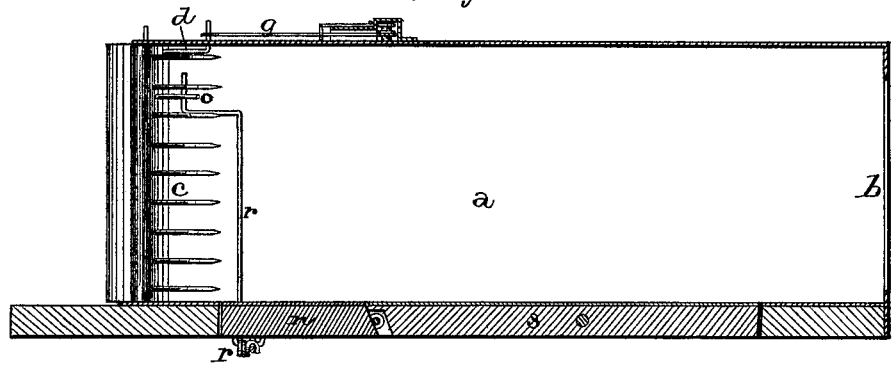
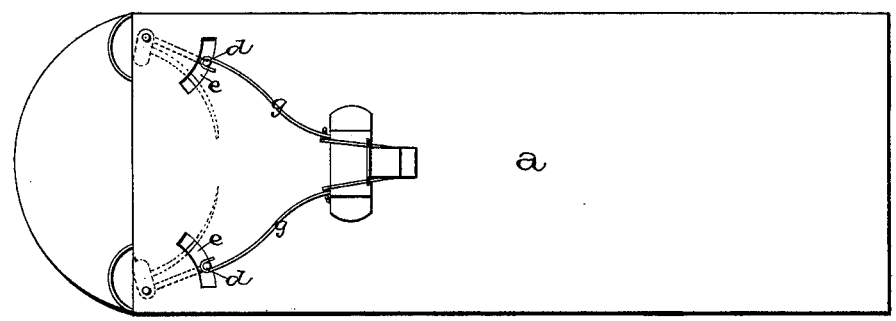
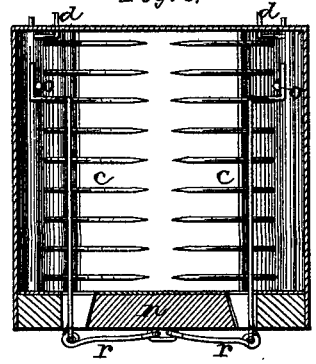
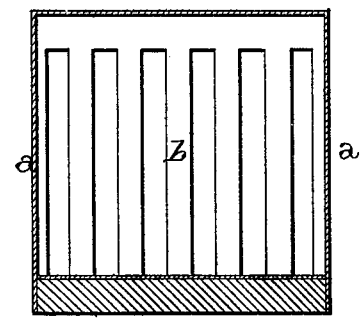
WITNESSES:
J. Wm. Garner
W. H. Kerr
INVENTOR:
Scott McBride
per
J. O. Lehmann,
Atty.

UNITED STATES PATENT OFFICE.

SCOTT McBRIDE, OF ST. CATHARINE, MISSOURI.

IMPROVEMENT IN ANIMAL-TRAPS.

Specification forming part of Letters Patent No. 198,246, dated December 18, 1877; application filed November 15, 1877.

*To all whom it may concern:*

Be it known that I, SCOTT MCBRIDE, of St. Catharine, in the county of Linn and State of Missouri, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in animal-traps; and it consists in the arrrangement and combination of parts, that will be more fully described hereinafter, whereby a simple, cheap, and effective trap is produced for catching animals of all kinds.

Figure 1 is a longitudinal section of my invention. Fig. 2 is a plan view of the same. Figs. 3 and 4 are vertical cross-sections.

$a$ represents the body of the trap, which is, preferably, made long, as here shown, and has an open grating, $b$, at its rear end, so as to admit the light, and let the animals see clear through.

The front end of the trap is closed by the two gates, $c$, which consist of sharp, curved wires, attached to a partially-revolving post, and which wires nearly meet near the center of the trap. Attached to each one of the posts, at its top, is a small cranked arm, $d$, the upper end of which extends through a circular slot, $e$, made through the top of the body $a$. To the upper ends of these cranks, above the top of the trap, is secured the spring $g$, which forces the two gates inward toward each other, so that they will instantly return to their position, after they have been opened by an animal coming into the trap, or from any other cause.

It will readily be seen from the construction of the gates that they open very readily, to allow an animal to pass into the trap; but should it attempt to get out after it has gotten in, or before it has passed wholly between the gates, the tighter the gates will close. If the animal has only gotten partially through the gate, any attempt on its part to back out will cause the gates to close on it in such a manner that the sharp wires will stick into it, and give it no alternative but to go on into the trap.

Just inside of the trap, beyond the ends of the sharp points of the gates, is the trap-door $n$, which is pivoted at its rear end, so that the front end can swing freely downward. Fastened to the under side of this door $n$ are the two bent arms, $r$, which are pivoted on the under side of the door of the trap, and, projecting up through the floor, have their ends bent, as shown, so as to strike against the rods $o$, which project outward from the inner side of the gate-posts. An animal passing through the gates steps upon this trap-door, and, bearing it downward, causes the bent rods $r$ to strike against the outer sides of the rods $o$, and thus force the gates against the sides of the animal entering, so that the slightest attempt on its part to back out will cause the sharp wires to catch against its sides.

Just beyond this trap-door is the large door $s$, which is pivoted near its center, and through which the animals are taken from the trap, after they have been caught.

Having thus described my invention, I claim—

1. The combination of the sharp-pointed wire gates $c$, provided with the cranks $d$, the cage having slots $e$ and springs $g$, whereby the gates are made self-closing, substantially as shown.

2. A trap-door, $n$, in combination with the bent pivoted rods $r$, and the rods $o$, that project from the gate-posts, whereby the tilting of the trap-door causes the gates to close against the sides of the animal, substantially as set forth.

In testimony that I claim the foregoing I have hereunto set my hand this 3d day of November, 1877.

SCOTT McBRIDE.

Witnesses:
J. M. STAUBER,
HENRY SMITH.